(12) United States Patent
Marumo et al.

(10) Patent No.: US 11,422,404 B2
(45) Date of Patent: Aug. 23, 2022

(54) DISPLAY DEVICE

(71) Applicant: Panasonic Intellectual Property Management Co., Ltd., Osaka (JP)

(72) Inventors: Koji Marumo, Kanagawa Ken (JP); Hideki Morinaga, Kanagawa Ken (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/212,829

(22) Filed: Mar. 25, 2021

(65) Prior Publication Data
US 2021/0302783 A1 Sep. 30, 2021

(30) Foreign Application Priority Data

Mar. 31, 2020 (JP) .............................. JP2020-064996

(51) Int. Cl.
| | | |
|---|---|---|
| *G02F 1/1335* | (2006.01) | |
| *B60R 1/04* | (2006.01) | |
| *B60R 1/08* | (2006.01) | |
| *B60R 1/12* | (2006.01) | |
| *G02F 1/01* | (2006.01) | |
| *G02F 1/133* | (2006.01) | |
| *G02F 1/1339* | (2006.01) | |
| *G02F 1/1343* | (2006.01) | |
| *G02F 1/137* | (2006.01) | |

(52) U.S. Cl.
CPC .......... *G02F 1/133536* (2013.01); *B60R 1/04* (2013.01); *B60R 1/088* (2013.01); *B60R 1/12* (2013.01); *G02F 1/0136* (2013.01); *G02F 1/137* (2013.01); *G02F 1/1339* (2013.01); *G02F 1/13306* (2013.01); *G02F 1/13439* (2013.01); *B60R 2001/1253* (2013.01); *G02F 2202/28* (2013.01); *G02F 2203/02* (2013.01); *G02F 2203/07* (2013.01)

(58) Field of Classification Search
None
See application file for complete search history.

(56) References Cited

U.S. PATENT DOCUMENTS

| | | | | |
|---|---|---|---|---|
| 5,762,823 | A * | 6/1998 | Hikmet | G02F 1/0063 252/299.01 |
| 7,502,156 | B2 | 3/2009 | Tonar et al. | |
| 2006/0007550 | A1* | 1/2006 | Tonar | B60R 1/088 359/604 |
| 2013/0128333 | A1* | 5/2013 | Agrawal | G02F 1/157 359/273 |
| 2017/0259744 | A1* | 9/2017 | Anzai | H04N 5/65 |
| 2019/0079304 | A1* | 3/2019 | Ando | B60R 1/04 |
| 2019/0270411 | A1* | 9/2019 | Dozeman | B60R 1/12 |
| 2021/0294133 | A1* | 9/2021 | Yuan | G02F 1/133305 |

* cited by examiner

*Primary Examiner* — Ryan Crockett
(74) *Attorney, Agent, or Firm* — Greenblum & Bernstein, P.L.C.

(57) ABSTRACT

The display device is mounted on a vehicle and includes a display, a reflectance control part, and a control circuit. The display includes a display surface on which a video is displayed, and is able to switch between on and off. The reflectance control part is positioned close to the display surface and is able to change a reflectance of incident light. The control circuit is configured to control a reflectance of the reflectance control part, the on and off of the display, and the video. The display surface is subjected to low reflection processing for reducing a reflectance of light.

18 Claims, 10 Drawing Sheets

DISPLAY DEVICE

CROSS-REFERENCE TO RELATED APPLICATIONS

This application is based upon and claims the benefit of priority from Japanese Patent Application No. 2020-064996, filed on Mar. 31, 2020, the entire contents of which are incorporated herein by reference.

FIELD

Embodiments described herein relate generally to a display device.

BACKGROUND

Recently, there has been considered the adoption of a display device capable of displaying a rear-side image of a vehicle that is captured by an imaging device instead of a conventional room mirror. A conventional example is described in U.S. Pat. No. 7,502,156.

The display device needs to be further improved.

SUMMARY

According to an aspect of the present disclosure, a display device that is mounted on a vehicle includes a display, a reflectance control part, and a control circuit. The display includes a display surface on which a video is displayed, and is able to switch between on and off. The reflectance control part is positioned close to the display surface and is able to change a reflectance of incident light. The control circuit is configured to control a reflectance of the reflectance control part, the on and off of the display, and the video. The display surface is subjected to low reflection processing for reducing a reflectance of light.

Note that embodiments implemented by optionally combining the above-described components or by converting the expression of the disclosure among methods, devices, and systems, are also valid as aspects of the disclosure.

DETAILED DESCRIPTION

Figure 1:
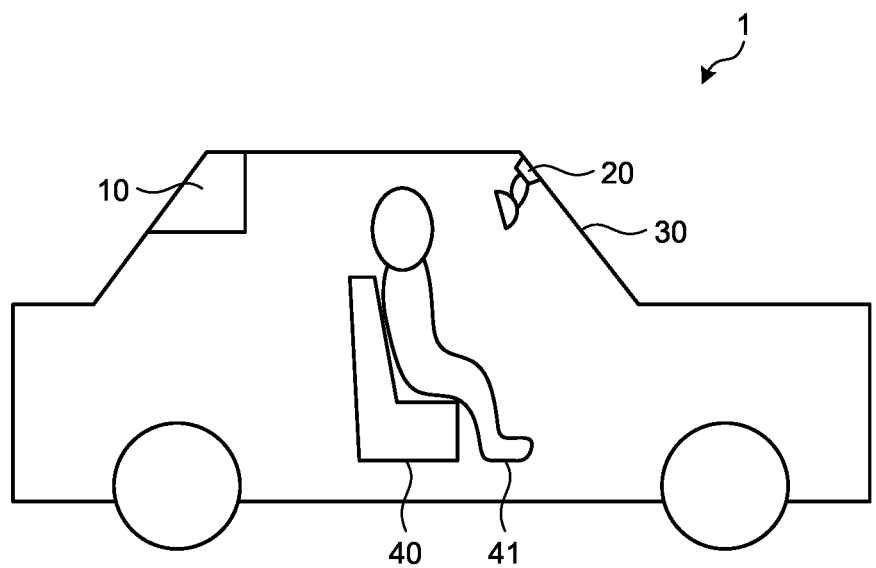
FIG. 1 is a diagram illustrating a structure of a vehicle according to an aspect of an embodiment of the disclosure.

In the following, the same or equivalent components, members, and steps illustrated in the drawings will be represented with the same referential numerals, and the repeated description thereof will be omitted. Moreover, the size of the members illustrated in the drawings may be appropriately enlarged or reduced for easy understanding.

First Embodiment

FIG. 1 is a diagram illustrating a structure of a vehicle 1 according to an aspect of an embodiment of the disclosure. In the vehicle 1 illustrated in FIG. 1, the right side of FIG. 1 corresponds to the front side. The vehicle 1 of FIG. 1 includes a front glass 30 and a seat 40.

An imaging device 10 is a camera imaging the rear side of the vehicle 1. The imaging device 10 is mounted on the rear side of the vehicle 1. The imaging device 10 outputs a captured video or image to a display device 20. The embodiment of the disclosure exemplifies the case in which the imaging device 10 and the display device 20 are connected to each other. However, the imaging device 10 may be connected to the display device 20 through an electronic control unit (ECU) (not illustrated), for example. The imaging device 10 may be also connected to the display device 20 through a network. Such connection uses any of wireless communication, wired communication, and the combination thereof.

The display device 20 is an electronic mirror device allowing an occupant 41 such as a driver seated on the seat 40 to visually recognize the rear side of the vehicle 1. The display device 20 is mounted on the vehicle 1. The display device 20 functions as a device displaying an image captured by the imaging device 10, or as a mirror, thereby allowing the occupant 41 to visually recognize the rear side of the vehicle 1. The display device 20 of FIG. 1 is arranged at the substantially center part of the front glass 30 in the vehicle 1. However, the position of the display device 20 is not limited to the substantially center part of the front glass 30, and may be different.

The following will describe the external structure of the display device 20.

Figure 2:
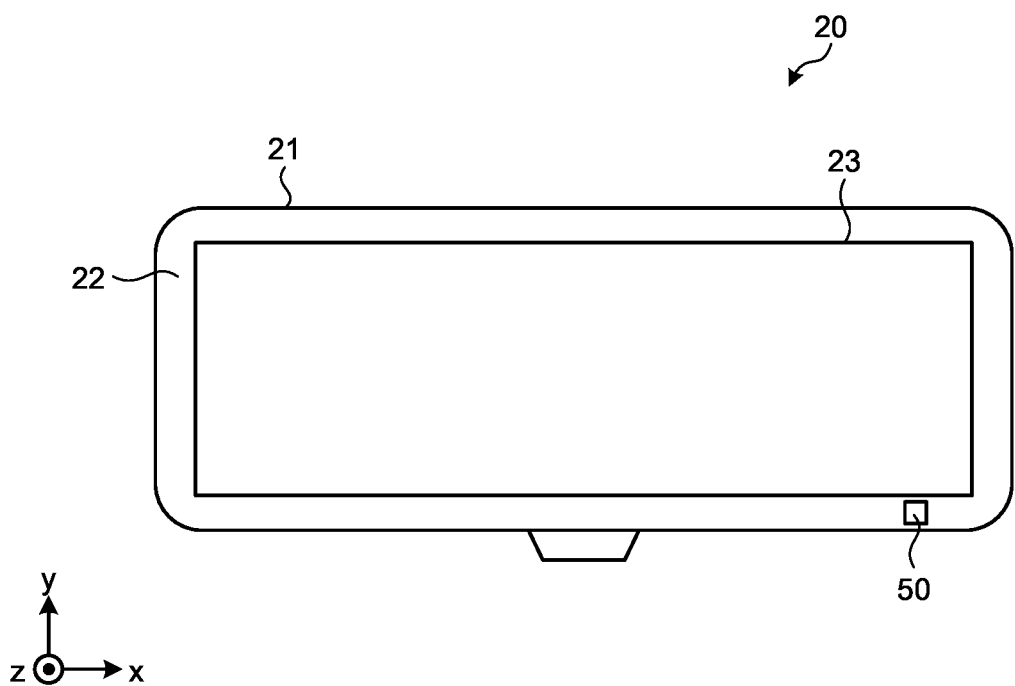
FIG. 2 is a front view illustrating an appearance of a display device according to an aspect of the embodiment of the disclosure, viewed from an occupant side.

FIG. 2 is a front view illustrating the appearance of the display device 20 according to an aspect of the embodiment of the disclosure, viewed from the occupant 41 side. As illustrated in FIG. 2, an orthogonal coordinate system formed by an x-axis, a y-axis, and a z-axis is defined. The z-axis direction corresponds to a direction vertical to the surface of a cover panel 22 of the display device 20. The x-axis direction corresponds to a direction orthogonal to the z-axis direction and parallel to the longitudinal direction of the display device 20. The y-axis direction corresponds to a direction orthogonal to the x-axis direction and parallel to the short direction of the display device 20.

The display device 20 includes a housing 21 and the cover panel 22. The display device 20 is covered by the housing 21 that has a box shape long in the y-axis direction. The housing 21 is supported by a supporting part fixed to the front glass 30. Moreover, the housing 21 includes an opening 23 on the front side of the display device 20. The opening 23 is covered by the cover panel 22. The display device 20 includes a variable reflectance mirror (VRM) 204 and a display 203 in the opening 23 covered by the cover panel 22.

Moreover, in the display device 20, an illuminance sensor 50 is provided on the front surface of the housing 21. The illuminance sensor 50 is covered and protected by the cover panel 22. The illuminance sensor 50 detects the intensity of light emitted to the front surface of the display device 20. For example, the illuminance sensor 50 detects the intensity of light emitted to the vehicle 1 from a following vehicle. The illuminance sensor 50 outputs a sensor value indicating the detected intensity of light to the display device 20. Note that the arrangement position of the illuminance sensor 50 is not limited to the display device 20, and may be different. For example, the illuminance sensor 50 may be arranged on the rear side of the vehicle 1. Furthermore, instead of the illuminance sensor 50, the imaging device 10 may detect the intensity of light.

Figure 3:
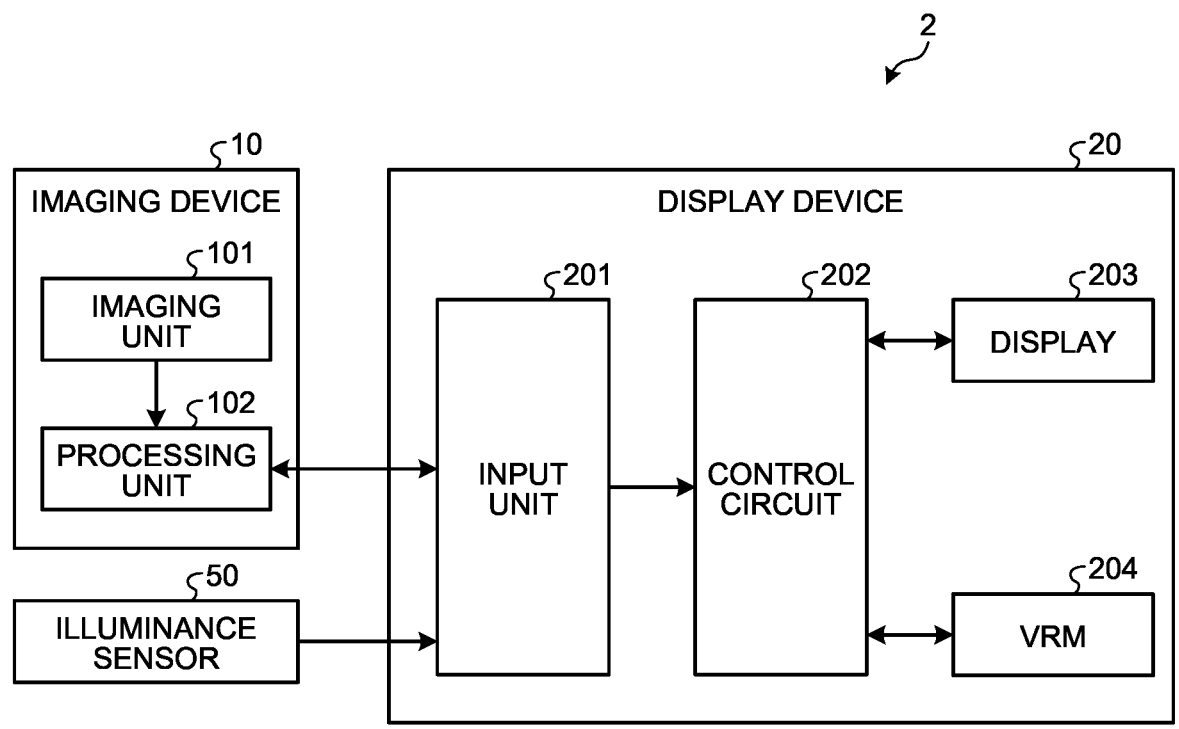
FIG. 3 is a block diagram illustrating a display system according to an aspect of the embodiment of the disclosure.

FIG. 3 is a block diagram illustrating a display system 2 according to an aspect of the embodiment of the disclosure. The display system 2 includes the imaging device 10, the display device 20, and the illuminance sensor 50.

The imaging device 10 includes an imaging unit 101 and a processing unit 102. The imaging unit 101 includes a solid-state image sensor. For example, the solid-state image sensor is a complementary metal oxide semiconductor (CMOS) image sensor, a charge coupled devices (CCD) image sensor, and the like. The solid-state image sensor converts light incident through a lens into electric video signals, and outputs the signals to a signal processing circuit (not illustrated). The signal processing circuit performs signal processing such as A/D conversion and noise removal on video signals input from the solid-state image sensor, and outputs the signals to the processing unit 102.

The processing unit 102 is achieved by cooperation of a hardware resource and a software resource or by only a hardware resource. The examples of the hardware resource include a central processing unit (CPU), a read only memory (ROM), a random access memory (RAM), a graphics processing unit (GPU), a digital signal processor (DSP), an application specific integrated circuit (ASIC), a field programmable gate array (FPGA), and a large scale integration (LSI). The examples of the software resource include a computer program such as firmware.

The processing unit 102 performs various kinds of video processing on video signals or image signals input from the imaging unit 101. The video processing includes gradation correction, color correction, contour correction, and the like. The processing unit 102 compresses the video signals or images on which various kinds of video processing have been performed, on the basis of a given compression system. Then, the processing unit 102 transmits the compressed video signals or image signals to the display device 20.

The display device 20 includes an input unit 201, a control circuit 202, the display 203, and the VRM 204.

The input unit 201 is an interface for inputting video signals or image signals output from the processing unit 102 of the imaging device 10 and values output from the illuminance sensor 50 to the display device 20. Note that the processing unit 102 and the illuminance sensor 50 may individually include the input unit 201.

The control circuit 202 processes video signals or image signals received from the imaging device 10 and sensor values received from the illuminance sensor 50. In accordance with the processing of these signals or values, the control circuit 202 controls actions of the display 203 and the VRM 204. That is, the control circuit 202 controls a reflectance of the VRM 204, the on and off of the display 203, and videos. To be more specific, the control circuit 202 changes modes of VRM 204 and the display 203, thereby controlling the VRM 204 and the display 203. The modes include a display mode and a mirror mode. Moreover, in the mirror mode, when a sensor value equal to or larger than a threshold is input from the illuminance sensor 50, the control circuit 202 changes the mode to a glare proof state in which the display device 20 reduces the intensity of reflected light.

The control circuit 202 may be achieved by cooperation of a hardware resource and a software resource or by only a hardware resource. The hardware resources include CPU, ROM, RAM, GPU, DSP, ASIC, FPGA, LSI, and the like. The examples of the software resource include a computer program such as firmware.

The display 203 includes a display surface on which a video is displayed, and allows switching between on and off. To be more specific, the display 203 switches the state between the on state where a video is displayed and the off state where a video is not displayed, on the basis of control signals output from the control circuit 202. Moreover, the display 203 displays videos or images on the basis of video data or image data output from the control circuit 202. That is, the display 203 displays videos or images captured by the imaging device 10. For example, the display 203 is a liquid crystal display or an electronic luminescent (EL) display.

The VRM 204 is positioned close to the display surface of the display 203, and is able to change a reflectance relative to the incident light. The VRM 204 is an example of a reflectance control part. To be more specific, the VRM 204 is arranged between the cover panel 22 and the display 203. Moreover, the control circuit 202 controls an application voltage in the VRM 204, whereby a reflectance of incident light is changed. That is, in the VRM 204, the transmittance of the light from the cover panel 22 side toward the display 203 side and the light from the display 203 side toward the cover panel 22 side are changed.

The following will describe the inner configuration of the display device 20.

Figure 4:
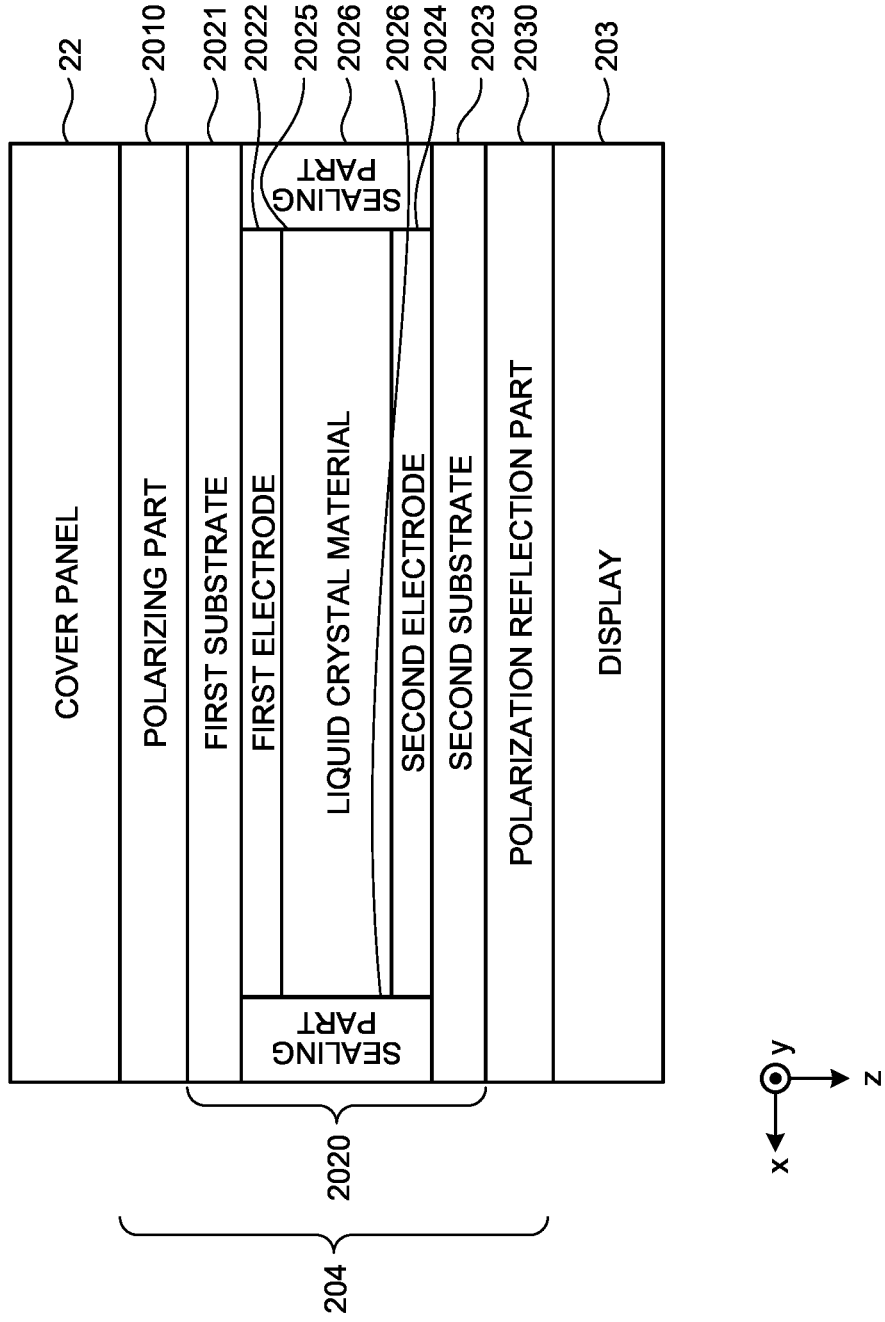
FIG. 4 is a section view illustrating a schematic example of the inner configuration of the display device according to an aspect of the embodiment of the disclosure.

FIG. 4 is a section view illustrating a schematic example of the inner configuration of the display device 20 according to an aspect of the embodiment of the disclosure. The display device 20 includes the cover panel 22, the VRM 204, and the display 203. The cover panel 22 is a transparent cover covering the VRM 204.

The VRM 204 is arranged between the cover panel 22 and the display 203. The VRM 204 changes a transmittance and a reflectance of light. In the case where the display device 20 functions as a mirror, it increases a reflectance of light of the VRM 204. Meanwhile, in the case where the display device 20 displays videos or images captured by the imaging device 10, it increases a transmittance of light of the VRM 204.

The VRM 204 includes a polarizing part 2010, a liquid crystal part 2020, and a polarization reflection part 2030.

The polarizing part 2010 transmits rays polarized in a specific direction out of incident rays. To be more specific, the polarizing part 2010 is a polarizing plate transmitting rays polarized in a specific direction out of rays transmitted through the cover panel 22. Moreover, the polarizing part 2010 absorbs rays traveling in other directions than the specific direction. The polarizing part 2010 may be formed of glass, a film, or other materials.

The liquid crystal part 2020 changes a polarizing direction of the rays transmitted through the polarizing part 2010. To be more specific, the liquid crystal part 2020 includes a liquid crystal material 2025, a pair of substrates of a first substrate 2021 and a second substrate 2023, and a sealing part 2026. To be still more specific, the first substrate 2021 and the second substrate 2023 includes planar electrodes that sandwich the liquid crystal material 2025 therebetween and are configured to apply a voltage to the liquid crystal material 2025. That is, the liquid crystal part 2020 includes the first substrate 2021 with a planar first electrode 2022 and the second substrate 2023 with a planar second electrode 2024. The first substrate 2021 and the second substrate 2023 are substrates formed of transparent materials such as a film or glass.

The first substrate 2021 with the first electrode 2022 and the second substrate 2023 with the second electrode 2024 are arranged to face each other. Space referred to as a gap exists between the first electrode 2022 and the second electrode 2024. The liquid crystal material 2025 is sealed in the space referred to as a gap. That is, the first electrode 2022 and the second electrode 2024 sandwich the liquid crystal material 2025 therebetween. The first electrode 2022 and the second electrode 2024 are transparent planar electrodes such as indium tin oxide (ITO) electrodes, for example.

Moreover, the liquid crystal part 2020 includes the sealing part 2026 sealing the liquid crystal material 2025. The sealing part 2026 is arranged on the outside of the edges of the first electrode 2022 and the second electrode 2024 and formed in a belt shape to surround the first electrode 2022 and the second electrode 2024. The sealing part 2026 bonds the first electrode 2022 and the second electrode 2024. Furthermore, the sealing part 2026 seals the liquid crystal material 2025 on the inner sides of the first electrode 2022 and the second electrode 2024.

In such a configuration, when a voltage is applied to the first electrode 2022 and the second electrode 2024, the liquid crystal part 2020 changes the arrangement of molecules of the liquid crystal material 2025 to a vertical direction, and thus let light transmitted through the liquid crystal part 2020 advance straight. Meanwhile, when a voltage is not applied to the first electrode 2022 and the second electrode 2024, the liquid crystal part 2020 does not change the arrangement of molecules of the liquid crystal material 2025, and thus changes the polarizing direction of the ray transmitted through the liquid crystal part 2020. For example, the liquid crystal part 2020 twists the polarizing direction of light by 90°.

The polarization reflection part 2030 transmits rays polarized in a specific direction and reflects rays traveling in other directions than the specific direction, out of rays transmitted through the liquid crystal part 2020. To be more specific, the polarization reflection part 2030 transmits rays polarized in a specific direction that is the same direction as the polarizing part 2010. Moreover, the polarization reflection part 2030 reflects rays traveling in other directions than the specific direction. With such a configuration, in a case where a voltage is not applied to the liquid crystal part 2020, the polarizing direction of the rays transmitted through the liquid crystal part 2020 is changed. Thus, the polarization reflection part 2030 reflects the rays transmitted through the liquid crystal part 2020 without transmitting it. Meanwhile, in a case where a voltage is applied to the liquid crystal part 2020, the polarizing direction of the rays transmitted through the liquid crystal part 2020 is not changed. Thus, the polarization reflection part 2030 transmits the rays transmitted through the liquid crystal part 2020.

The display 203 displays videos captured by the imaging device 10 imaging the rear side of the vehicle 1. Moreover, the display surface of the display 203 is subjected to low reflection processing for reducing a reflectance of light. That is, in the display 203, the surface where the light transmitted through the polarization reflection part 2030 is incident is subjected to low reflection processing for reducing a reflectance of light. For example, the low reflection processing such as low reflectance (LR) coating or anti reflectance (AR) coating is performed. Moreover, as low reflectance processing, an optical adhesive is applied on the display surface of the display 203, and the display 203 is bonded to the polarization reflection part 2030. To be more specific, an optical adhesive such as optical clear resin (OCR) or an optical clear adhesive (OCA) is applied on the display 203. Then, the polarization reflection part 2030 of the VRM 204 and the display 203 are bonded to each other by the optical adhesive such as OCR or OCA. In this manner, the display 203 reduces a reflectance on the surface thereof. Note that the display 203 may be subjected to low reflectance processing of both the processing such as LR coating or AR coating and the processing with an optical adhesive, or may be subjected to one of the low reflectance processing.

The following will describe each mode of the display device 20. The display device 20 includes a mirror mode and a display mode.

Figure 5:
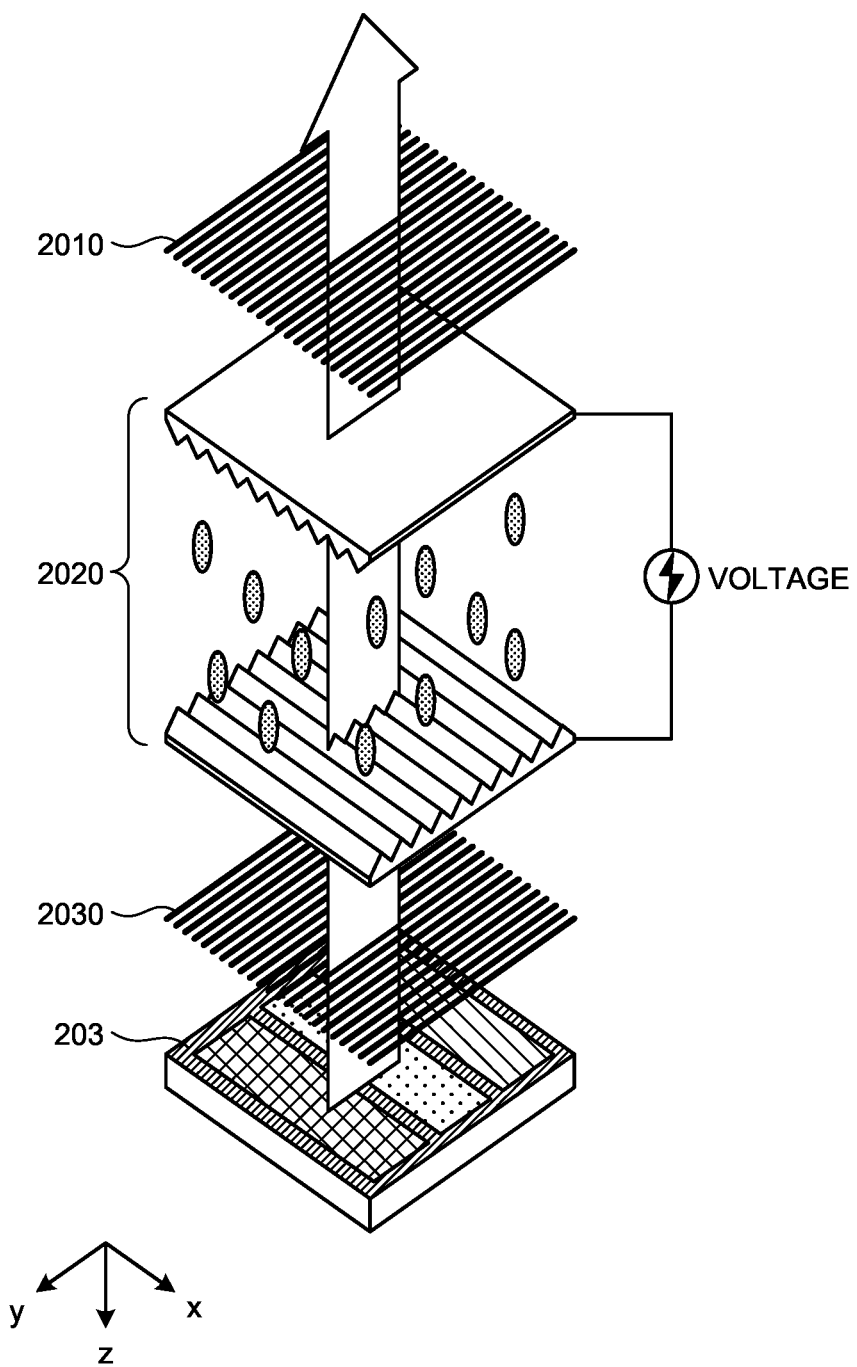
FIG. 5 is an explanatory diagram for explaining a display mode according to an aspect of the embodiment of the disclosure.

The display mode is a mode where the display device 20 is controlled to display videos and images captured by the imaging device 10. FIG. 5 is an explanatory diagram for explaining a display mode according to an aspect of the embodiment of the disclosure.

In the display mode, the control circuit 202 applies a voltage on the liquid crystal part 2020. Moreover, the control circuit 202 turns on the display 203, and displays a video on the display surface of the display 203.

The polarization reflection part 2030 transmits rays polarized in a specific direction out of rays from the screen displayed by the display 203.

A voltage is applied to the liquid crystal part 2020. Thus, with molecules of the liquid crystal material 2025, the liquid crystal part 2020 transmits light incident from the polarization reflection part 2030 without changing the polarizing direction of the light.

The polarizing part 2010 transmits light in the same direction as the polarization reflection part 2030. In the display mode, the liquid crystal part 2020 does not change the polarizing direction of the light incident from the polarization reflection part 2030. Thus, the light transmitted through the liquid crystal part 2020 transmits the polarizing part 2010.

In this manner, the display device 20 displays videos and images captured by the imaging device 10 in the display mode.

Figure 6:
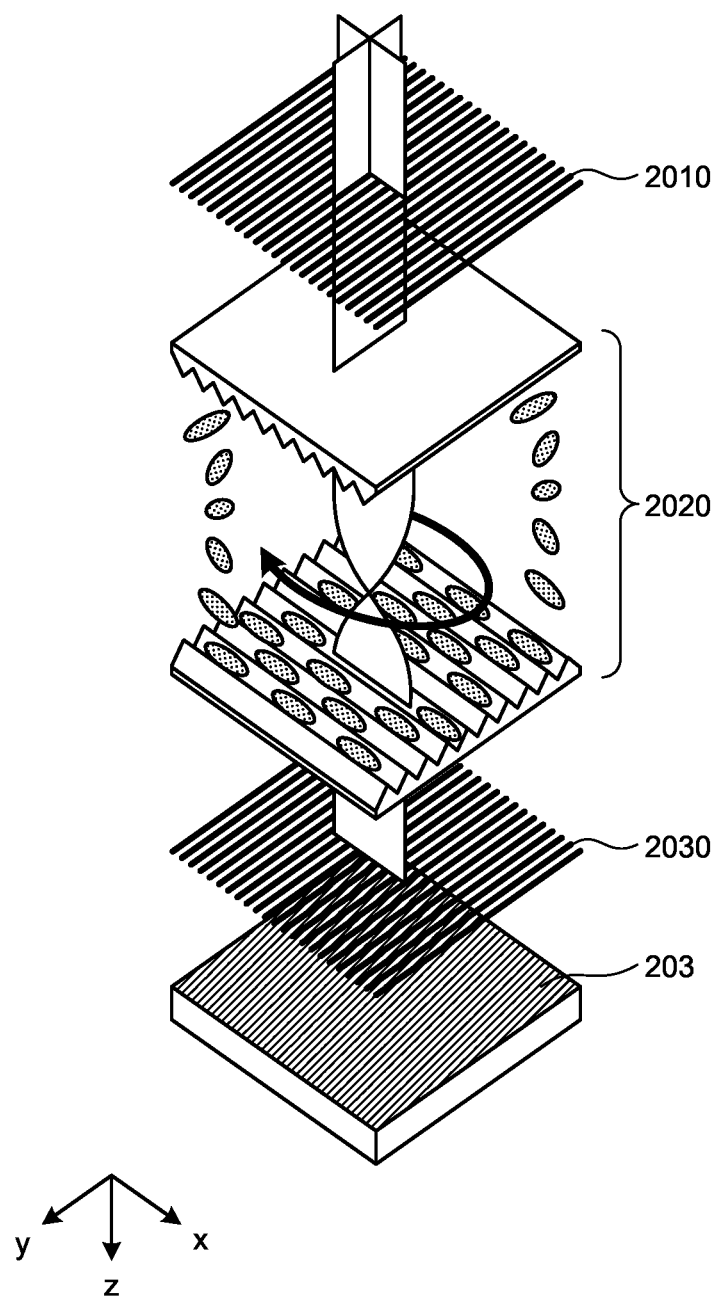
FIG. 6 is an explanatory diagram for explaining the incidence of light in a mirror mode according to an aspect of the embodiment of the disclosure.
Figure 7:
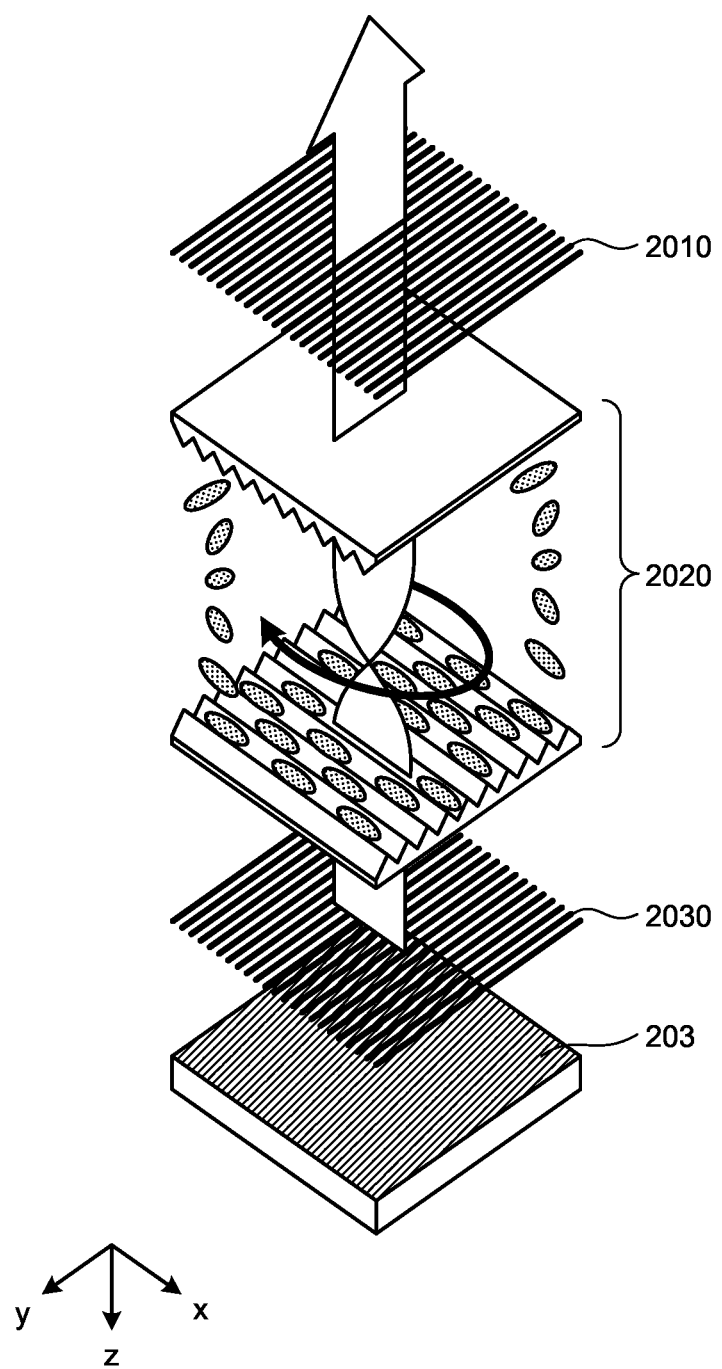
FIG. 7 is an explanatory diagram for explaining the reflection of light in the mirror mode according to an aspect of the embodiment of the disclosure.

The mirror mode is a mode where the display device 20 functions as a mirror. In other words, the mirror mode is a mode where the polarization reflection part 2030 of the display device 20 is controlled to reflect light. Moreover, the mirror mode has a glare proof state in which when the illuminance sensor 50 has detected intense light, reduced light is reflected. FIG. 6 is an explanatory diagram for explaining the incidence of light in the mirror mode according to an aspect of the embodiment of the disclosure. FIG.

7 is an explanatory diagram for explaining the reflection of light in the mirror mode according to an aspect of the embodiment of the disclosure.

In the mirror mode, the control circuit 202 does not apply a voltage on the liquid crystal part 2020. Moreover, the control circuit 202 turns off the display 203, and does not display a video on the display surface of the display 203.

When rays transmitted through the cover panel 22 are incident, the polarizing part 2010 transmits rays polarized in a specific direction out of the rays transmitted through the cover panel 22.

A voltage is not applied to the liquid crystal part 2020. Thus, with molecules of the liquid crystal material 2025, the liquid crystal part 2020 changes the polarizing direction of the light incident from the polarizing part 2010. For example, the liquid crystal part 2020 twists the polarizing direction of the light incident from the polarizing part 2010 by 90°.

The polarization reflection part 2030 transmits light in the same direction as the polarizing part 2010. That is, the polarization reflection part 2030 is not able to transmit the light the polarizing direction of which has been changed by the liquid crystal part 2020. In other words, the polarization reflection part 2030 reflects the light transmitted through the liquid crystal part 2020. Here, the polarizing direction of the light incident on the polarization reflection part 2030 is changed by the liquid crystal part 2020. Thus, in the mirror mode, the polarization reflection part 2030 reflects incident light.

When the polarization reflection part 2030 has reflected light, the liquid crystal part 2020 changes the polarizing direction of the light reflected by the polarization reflection part 2030. For example, the liquid crystal part 2020 twists the polarizing direction of the light incident from the polarizing part 2010 by 90°. As a result, the light transmitted through the liquid crystal part 2020 restores the angle at the time of transmission through the polarizing part 2010. Thus, the light transmitted through the liquid crystal part 2020 transmits the polarizing part 2010.

In this manner, the display device 20 reflects light in the mirror mode. That is, the display device 20 functions as a mirror.

Figure 8:
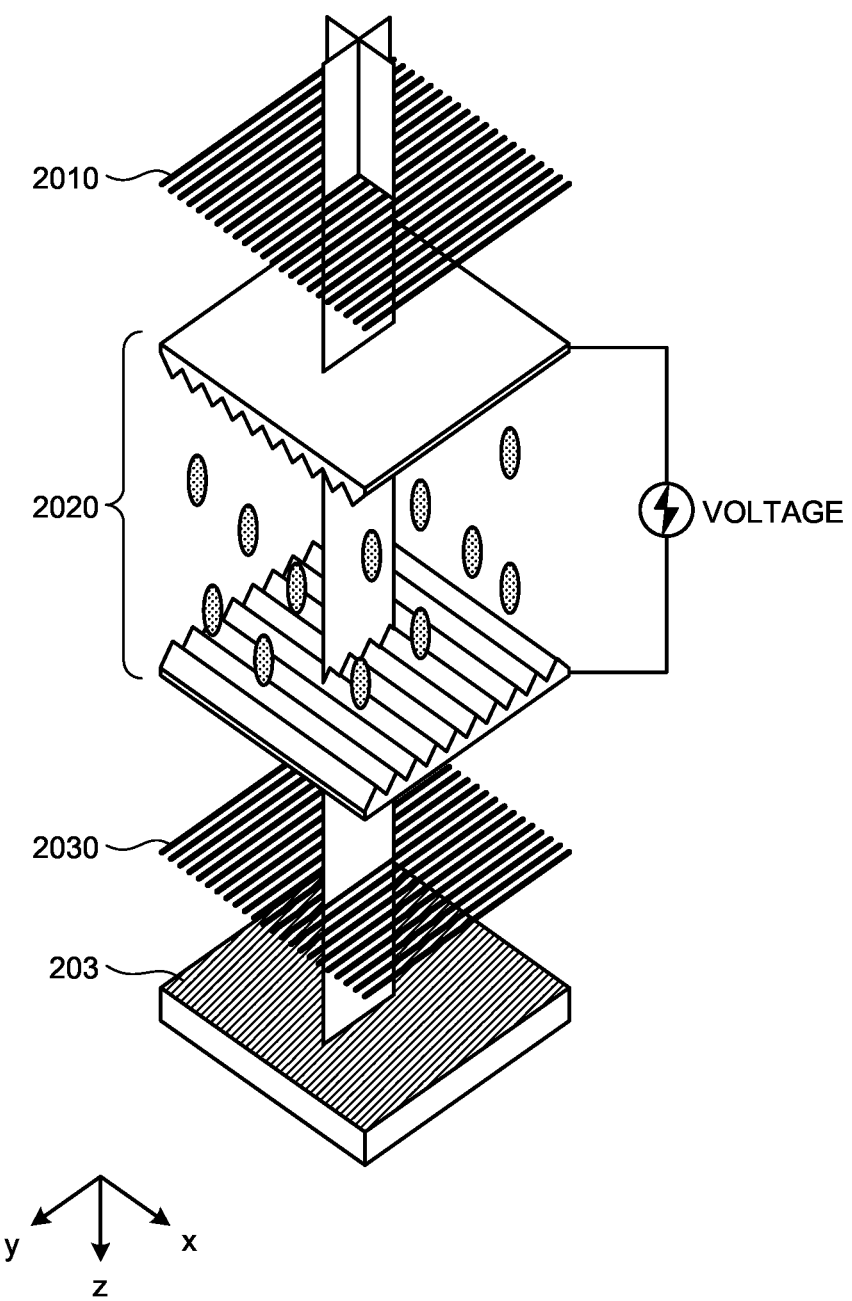
FIG. 8 is an explanatory diagram for explaining a glare proof state according to an aspect of the embodiment of the disclosure.

The glare proof state is a state where in the mirror mode, when the illuminance sensor 50 has detected intense light, reduced light is reflected. FIG. 8 is an explanatory diagram for explaining the glare proof state according to an aspect of the embodiment of the disclosure.

In the glare proof state, the control circuit 202 controls a voltage applied on the liquid crystal part 2020 so as to reduce the amount of light reflected by the polarization reflection part 2030. Moreover, the control circuit 202 turns off the display 203, and does not display a video on the display surface of the display 203.

The polarizing part 2010 transmits rays polarized in a specific direction out of rays transmitted through the cover panel 22.

The liquid crystal part 2020 aligns molecules of the liquid crystal material 2025 in accordance with an applied voltage. In this manner, the liquid crystal part 2020 changes the polarizing direction of light incident from the polarizing part 2010.

The polarization reflection part 2030 reflects some of the rays transmitted through the liquid crystal part 2020. Here, the liquid crystal part 2020 changes the polarizing direction of light. Furthermore, the polarizing direction of the light transmitted through the liquid crystal part 2020 is not a component of completely one direction. Thus, the polarization reflection part 2030 reflects light of a polarizing direction different from the polarizing direction of the polarization reflection part 2030. In other words, the polarization reflection part 2030 reflects light transmitted through the liquid crystal part 2020 with a low reflectance. In this manner, the display device 20 is able to be glare proof relative to incident light.

Here, the polarization reflection part 2030 transmits some of the rays transmitted through the liquid crystal part 2020. That is, the light transmitted through the polarization reflection part 2030 reaches the display 203. The display 203 reflects the light transmitted through the polarization reflection part 2030. As a result, the display device 20 emits the light reflected by the polarization reflection part 2030 and the light reflected by the display 203. That is, the display device 20 forms a double reflection in which a reflected image by the light reflected by the display 203 overlaps behind a reflected image by the light reflected by the polarization reflection part 2030. For example, the display device 20 displays a reflected image as if light were emitted toward the back side of the original reflected image.

Thus, the surface of the display 203 is subjected to low reflection processing for reducing a reflectance. For example, the display 203 is bonded to the VRM 204 by an optical adhesive such as OCR or OCA. This reduces the reflectance on the display 203 of the light transmitted through the polarization reflection part 2030. Therefore, the display device 20 is able to prevent a double reflection in which a reflected image by the light reflected by the display 203 overlaps behind a reflected image by the light reflected by the polarization reflection part 2030.

The following will describe the arrangement of the sealing part 2026 in the liquid crystal part 2020.

Figure 9:
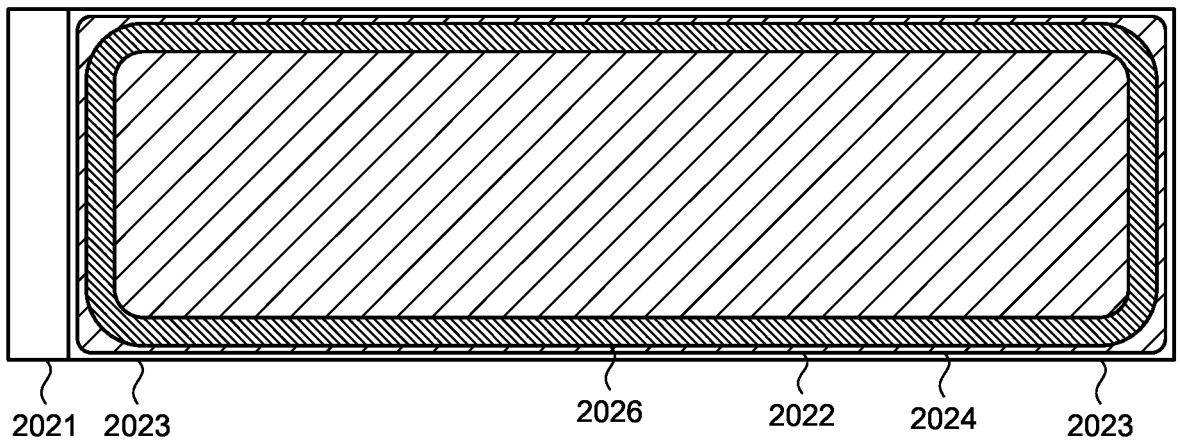
FIG. 9 is an explanatory diagram for explaining the arrangement of a sealing part in a conventional display device.
Figure 9:
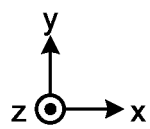
Figure 10:
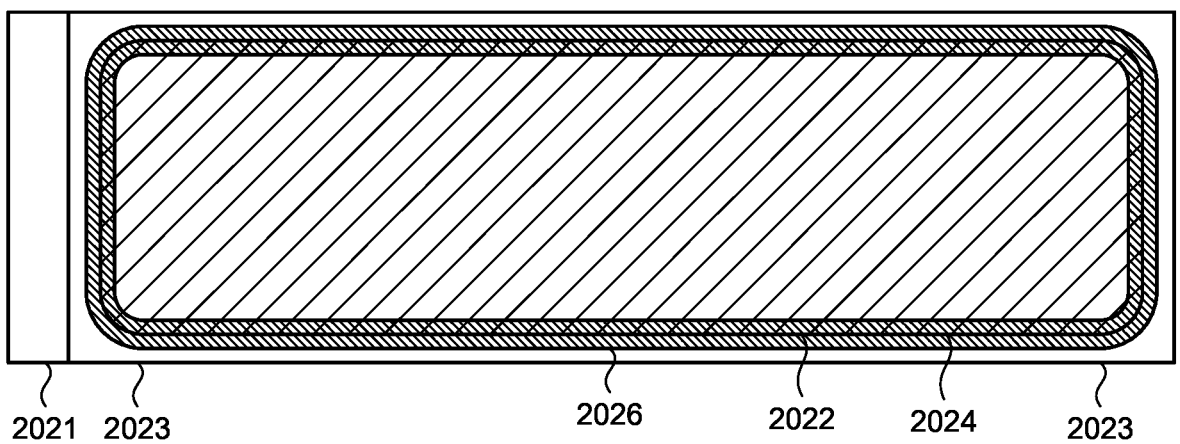
FIG. 10 is an explanatory diagram for explaining the arrangement of a sealing part in the display device according to an aspect of the embodiment of the disclosure.
Figure 10:
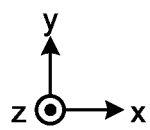

FIG. 9 is an explanatory diagram for explaining the arrangement of the sealing part 2026, the first electrode 2022, and the second electrode 2024 in the conventional display device 20. FIG. 10 is an explanatory diagram for explaining the arrangement of the sealing part 2026, the first electrode 2022, and the second electrode 2024 in the display device 20 according to an aspect of the embodiment of the disclosure.

Conventionally, the first electrode 2022 and the second electrode 2024 are arranged to sandwich the liquid crystal material 2025 therebetween, as illustrated in FIG. 9. The edges of the first electrode 2022 and the second electrode 2024 are arranged on the outer side of the sealing part 2026. In the case of a liquid crystal display, the first electrode and the second electrode on the outer side of the sealing part are protected by a metal frame referred to as a bezel. That is, in the case of a liquid crystal display or the like, the first electrode and the second electrode are hardly influenced by static electricity even if the electrodes are positioned on the outer side of the sealing part because the static electricity escape toward the bezel. Meanwhile, in the display device 20 that is an electronic mirror device, the VRM 204 is arranged to be close to the occupant 41 on the outer side where static electricity flows in easily. Thus, in the display device 20, it is difficult to protect the first electrode 2022 and the second electrode 2024 by the bezel.

When the static electricity occurred outside the display device 20 flows into the display device 20, the static electricity easily flows into the VRM 204 on the outside of the display device 20. In such a case, if a part of the first electrode 2022 and the second electrode 2024 is exposed to the outside of the sealing part 2026, as illustrated in FIG. 9, static electricity may flow into the electrode parts positioned on the outside of the sealing part 2026. In such a case, the sealing part 2026, the first electrode 2022, or the second electrode 2024 may be damaged.

Here, as illustrated in FIG. 10, the sealing part 2026 is formed into a belt shape to surround the first electrode 2022 and the second electrode 2024, and arranged so that the outer edge of the sealing part 2026 is positioned on the outside of the edges of the first electrode 2022 and the second electrode 2024. Note that the sealing part 2026 may be arranged at a position that may or may not overlap the edges of the first electrode 2022 and the second electrode 2024 as long as the outer edge of the sealing part 2026 is arranged on the outer side of the edges of the first electrode 2022 and the second electrode 2024. With such arrangement, even if static electricity flows into the display device 20, the static electricity hardly flows into the first electrode 2022 or the second electrode 2024 because of the sealing part 2026. Thus, in the display device 20, even if static electricity flows into the first electrode 2022 and the second electrode 2024, it is possible to reduce the possibility of damaging the first electrode 2022 and the second electrode 2024.

The display device 20 of the embodiment of the disclosure includes the polarization reflection part 2030 and the display 203 on the opposite side relative to the liquid crystal part 2020 from the occupant 41. Therefore, if the thickness of the liquid crystal part 2020 is large, a video is formed at a considerably deep position from the outermost surface of the display device 20, which may cause a strange feeling of the occupant 41.

Thus, it is acceptable that the thickness of the first substrate 2021 and the thickness of the second substrate 2023 are thin. For example, in a case where the first substrate 2021 and the second substrate 2023 are made of glass, they may be thin by slimming processing for shaving the first substrate 2021 and the second substrate 2023. To be more specific, the thickness of the first substrate 2021 and the thickness of the second substrate 2023 may be equal to or smaller than 0.55 mm and equal to or larger than 0.3 mm. That is, the first substrate 2021 and the second substrate 2023 that are a pair of transparent substrates sandwiching the liquid crystal material 2025 therebetween may each have a thickness equal to or smaller than 0.3 mm. Moreover, the first substrate 2021 and the second substrate 2023 may be films each having a thickness of substantially 0.15 mm. In this manner, it is possible to make the position where a video is formed closer to the outermost surface of the display device 20. Therefore, it is possible to mitigate the strange feeling of the occupant 41 in confirming the video. Furthermore, it is possible to reduce the weight of the display device 20 by thinning the first substrate 2021 and the second substrate 2023.

Conventionally, the polarizing plate of the liquid crystal display has been required to have a high degree of polarization so as to increase the contrast of a displayed image. Here, considering the X-axis and Y-axis orthogonal to light, the ideal polarizing plate transmits 100% of light of the X-axis and absorbs 100% of light of the Y-axis. However, in fact, the light of the Y-axis is leaked without being absorbed entirely. The leaked light reduces the contrast of the liquid crystal display. Meanwhile, if the light of the Y-axis is to be absorbed nearly entirely, the transmittance of the light of the X-axis is reduced. In the case of a general liquid crystal display, prioritizing the securing of the contrast, there is used a polarizing plate having a lower transmittance and a higher absorbance than in the ideal state. Here, the room mirror is required by law to have a reflectance equal to or larger than a certain degree. If the polarizing plate used in the liquid crystal display is used for the polarizing part 2010, the reflectance required for a room mirror is difficult to satisfy.

To be more specific, if the transmittance of the polarizing part 2010 is reduced, rays reaching the polarization reflection part 2030 out of the rays incident on the cover panel 22 are reduced. As a result, the VRM 204 has a lower reflectance. Thus, it is acceptable that the polarizing part 2010 is made of a material having a high transmittance. In this manner, the display device 20 as a room mirror is able to satisfy the condition of the reflectance required by law.

Moreover, the inside of the vehicle 1 may be high in temperature. Thus, the polarizing part 2010 may be formed of a polarizing film using dye. The polarizing film using dye is superior in high temperature durability to a polarizing film using iodine. This improves the reliability of the polarizing part 2010.

The following will describe the connection between the first electrode 2022 and the second electrode 2024 and a flexible printed circuits (FPC) 2027.

Figure 11:
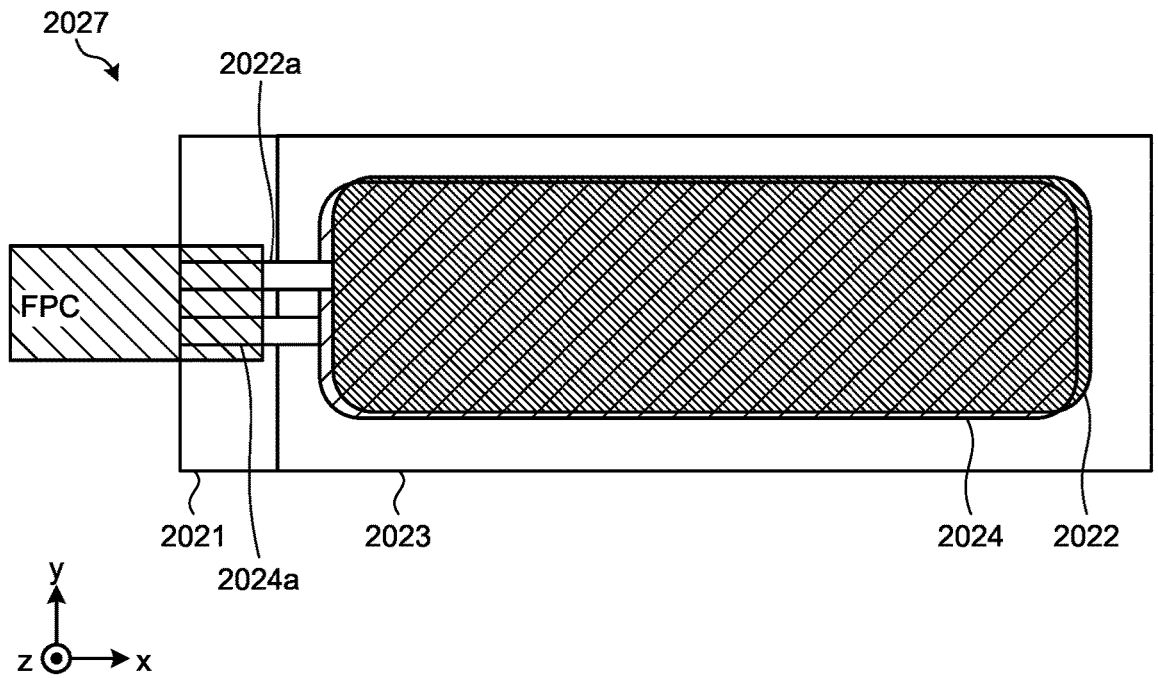
FIG. 11 is an explanatory diagram for explaining a conventional method for connection to an FPC.
Figure 12:
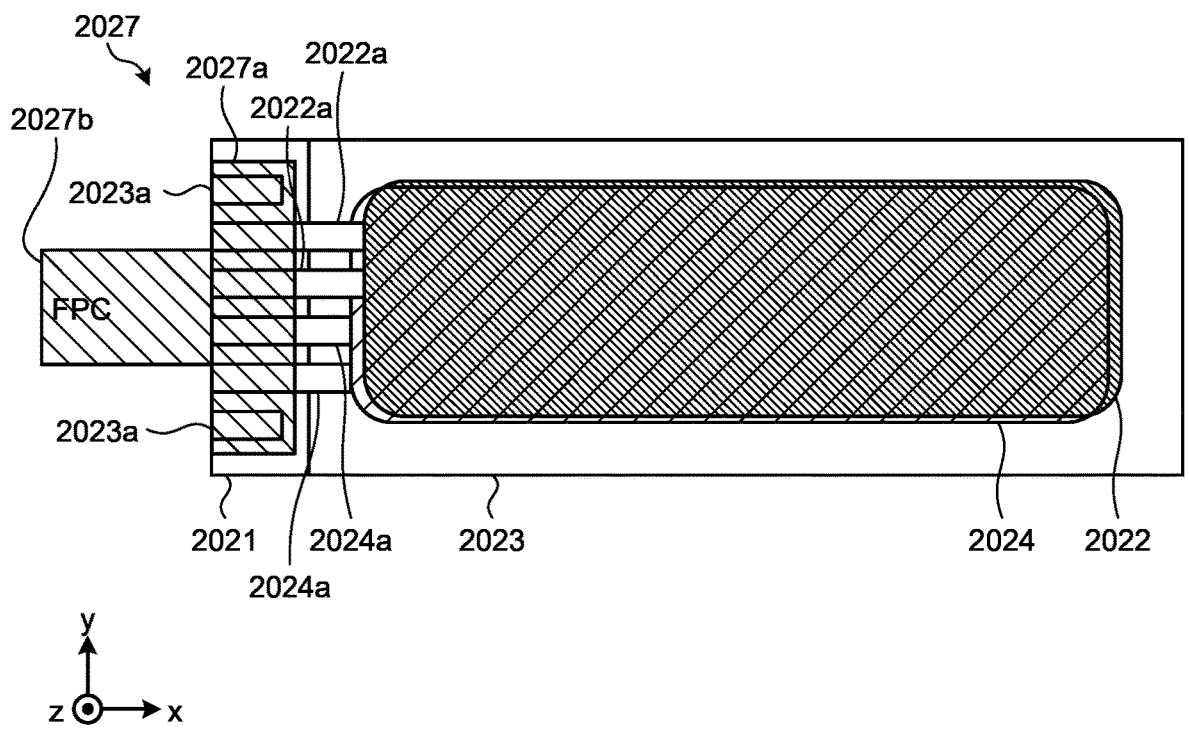
FIG. 12 is an upper surface diagram for explaining a method for connection to an FPC in the display device according to an aspect of the embodiment of the disclosure.
Figure 13:
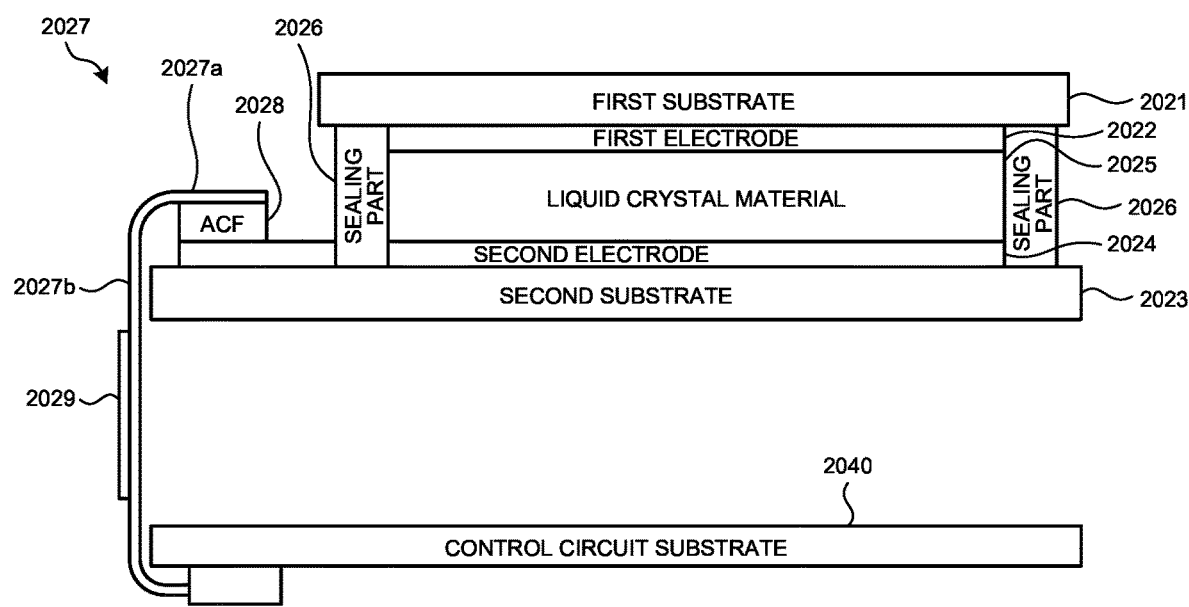
FIG. 13 is a section view for explaining a method for connection to an FPC in the display device according to an aspect of the embodiment of the disclosure.

FIG. 11 is an explanatory diagram for explaining a conventional method for connection to the FPC 2027. FIG. 12 is an upper surface diagram for explaining a method for connection to the FPC 2027 in the display device 20 according to an aspect of the embodiment of the disclosure. FIG. 13 is a section view for explaining a method for connection to the FPC 2027 in the display device 20 according to an aspect of the embodiment of the disclosure.

The first electrode 2022 includes a first terminal 2022a to which a voltage is applied. Similarly, the second electrode 2024 includes a second terminal 2024a to which a voltage is applied. With the use of an anisotropic conductive film (ACF) 2028, the first terminal 2022a and the second terminal 2024a are press-bonded to a terminal of the FPC 2027 to which a voltage is applied. As illustrated in FIG. 11, for the application of a voltage from the first electrode 2022 and the second electrode 2024 on the liquid crystal material 2025, it is only necessary that each of one first terminal 2022a of the first electrode 2022 and one second terminal 2024a of the second electrode 2024 is press-bonded to the terminal of the FPC 2027. However, if only one first terminal 2022a of the first electrode 2022 and one second terminal 2024a of the second electrode 2024 are press-bonded to the FPC 2027, the bonding strength between the FPC 2027 and the first electrode 2022 and the second electrode 2024 is not sufficient. This may cause the FPC 2027 to be removed from the first electrode 2022 and the second electrode 2024.

Thus, as illustrated in FIG. 12, the first electrode 2022 may include a plurality of first terminals 2022a. Similarly, the second electrode 2024 may include a plurality of second terminals 2024a. That is, a pair of transparent substrates include the first substrate 2021 with a plurality of first terminals 2022a and the second substrate 2023 with a plurality of second terminals 2024a. Moreover, a control circuit substrate 2040 including the control circuit 202 is connected to the first substrate 2021 and the second substrate 2023 through the FPC 2027. That is, the first substrate 2021 is connected to the FPC 2027 through the first terminals 2022a, and the second substrate 2023 is connected to the FPC 2027 through the second terminals 2024a. Moreover, the FPC 2027 may include a dummy terminal. The dummy terminal is a terminal to which a voltage is not applied. The dummy terminal is connected to, among the first terminals 2022a, the remaining first terminals 2022a other than at least one terminal to which a voltage is applied. Similarly, the dummy terminal is connected to, among the second terminals 2024a, the remaining second terminals 2024a other than at least one terminal to which a voltage is applied. In the FPC 2027 illustrated in FIG. 12, the dummy terminal is connected to the first terminal 2022a and the second terminal 2024a that are each positioned on the outer side among the first terminals 2022a and the second terminals 2024a, for example. Then, the dummy terminal is press-bonded to the FPC 2027 using the ACF 2028. Such a configuration increases an area where the first terminal 2022a and the second terminal 2024a are press-bonded to the terminal of the FPC 2027. Thus, it is possible to increase the bonding strength between the first electrode 2022 and the second electrode 2024 and the FPC 2027. The number of dummy terminals may be one or three or more.

Furthermore, as illustrated in FIG. 12, the second substrate 2023 may include a dummy electrode 2023a that is press-bonded to the dummy terminal of the FPC 2027. The dummy electrode 2023a is formed of the same material as that of the first electrode 2022 and the second electrode 2024, for example. With such a configuration, it is possible to further increase the bonding strength between the first electrode 2022 and the second electrode 2024 and the terminal of the FPC 2027. Alternatively, instead of the dummy terminal and the dummy electrode 2023a, the first electrode 2022 and the second electrode 2024 may respectively include a plurality of first terminals 2022a and a plurality of second terminals 2024a to which a voltage is applied, and the FPC 2027 may include the corresponding number of terminals connected thereto. For example, the first electrode 2022 may include two first terminals 2022a to which a voltage is applied, the second electrode 2024 may include two second terminals 2024a to which a voltage is applied, and the FPC 2027 may include four terminals. Also with such a configuration, it is possible to obtain the same effects as the case where the dummy terminal and the dummy electrode 2023a are provided.

Moreover, the FPC 2027 has a shape not exposed from the first substrate 2021 and the second substrate 2023. Here, to minimize a frame edge on the outside of the display area in the display device 20, it is necessary to fold the FPC 2027 on the immediately outside of the second substrate 2023, as illustrated in FIG. 13. The FPC 2027 illustrated in FIG. 13 includes a root part 2027a connected to the second substrate 2023 and a distal part 2027b extending from the root part 2027a to the control circuit substrate 2040. If the widths of the root part 2027a and the distal part 2027b are same, it is difficult to fold the FPC 2027 on the immediately outside of the second substrate 2023. Meanwhile, in the FPC 2027 illustrated in FIG. 13, the width of the distal part 2027b is smaller than the width of the root part 2027a. Thus, it is easy to fold the FPC 2027 at the distal part 2027b, which makes it easy to fold the FPC 2027 on the immediately outside of the second substrate 2023. This reduces the probability that the press-bonded part of the terminal of the FPC 2027 is caught by other members when the FPC 2027 is incorporated to the VRM 204.

Furthermore, as illustrated in FIG. 13, the liquid crystal part 2020 includes a reinforcing plate 2029 guiding the FPC 2027. The reinforcing plate 2029 guides the FPC 2027, so as to prevent the case where the FPC 2027 is bent in the midway, and thus cannot be appropriately connected to the control circuit substrate 2040 or is caught by the housing 21.

Space referred to as a gap exists between the first electrode 2022 and the second electrode 2024 of the liquid crystal part 2020 according to the embodiment of the disclosure. The color of the displayed image is changed by changing the width of this gap. Moreover, if the gap is made narrower, the transmittance of light transmitted through the liquid crystal part 2020 is reduced. That is, the reflectance of the display device 20 is reduced. In contrast, if the gap is made wider, the transmittance of light transmitted through the liquid crystal part 2020 increases. That is, the reflectance of the display device 20 increases.

If the gap is made wider, however, the colors of images displayed in the display mode and reflected images in the mirror mode are changed from the actual scenes. Thus, the liquid crystal part 2020 adjusts the gap width to an appropriate value, thereby achieving both the securing of a reflectance and the displaying of an image in a color with which the strange feeling of the occupant 41 is mitigated. To be more specific, the width of the gap between the first substrate 2021 and the second substrate 2023 that are a pair of transparent substrates sandwiching the liquid crystal material 2025 therebetween is preferably equal to or smaller than 7 μm.

The above-described aspect enables further improvement of the display device.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display device that is mounted on a vehicle, the display device comprising:
    a display that includes a display surface on which a video is displayed, the display being able to switch between on and off;
    a reflectance control part that is positioned close to the display surface, the reflectance control part being able to change a reflectance of incident light; and
    a control circuit configured to control a reflectance of the reflectance control part, the on and off of the display, and the video, wherein
    the display surface is subjected to low reflection processing for reducing a reflectance of light,
    the reflectance control part includes:
        a polarizing part that transmits rays polarized in a specific direction out of incident rays;
        a liquid crystal part that changes a polarizing direction of the rays transmitted through the polarizing part; and
        a polarization reflection part that transmits a ray polarized in a specific direction and reflects rays traveling in other directions than the specific direction, out of the rays transmitted through the liquid crystal part, and
    the liquid crystal part includes:
        a liquid crystal material;
        a pair of transparent substrates that sandwich the liquid crystal material therebetween, each of the transparent substrates including a planar electrode configured to apply a voltage to the liquid crystal material; and
        a sealing part that seals the liquid crystal material, the sealing part being formed in a belt shape to surround the electrodes and being arranged to overlap the electrodes and so that an outer edge of the sealing part is positioned outside of edges of the electrodes.

2. The display device according to claim 1, wherein an optical adhesive is applied on the display surface as the low reflection processing, and the display surface is bonded to the reflectance control part.

3. The display device according to claim 1, wherein a thickness of each of the transparent substrates is equal to or smaller than 0.3 mm.

4. The display device according to claim 2, wherein a thickness of each of the transparent substrates is equal to or smaller than 0.3 mm.

5. The display device according to claim 2, wherein the transparent substrates include a first substrate with a plurality of first terminals and a second substrate with a plurality of second terminals, the control circuit is connected to the first substrate and the second substrate through flexible printed circuits (FPC), and the first substrate is connected to the FPC through the plurality of first terminals, and the second substrate is connected to the FPC through the plurality of second terminals.

6. The display device according to claim 5, wherein the FPC include a root part connected to the second terminals and a distal part connected to the control circuit, and a width of the distal part is smaller than a width of the root part.

7. The display device according to claim 2, wherein a gap between the transparent substrates is equal to or smaller than 7 µm.

8. The display device according to claim 2, wherein an inner edge of the sealing part is positioned inside of the edges of the electrodes.

9. The display device according to claim 8, wherein the inner edge of the sealing part is entirely positioned inside of the edges of the electrodes.

10. The display device according to claim 9, wherein the outer edge of the sealing part is entirely positioned outside of the edges of the electrodes.

11. The display device according to claim 2, wherein a thickness of each of the transparent substrates is equal to or smaller than 0.55 mm and equal to or larger than 0.3 mm.

12. The display device according to claim 1, wherein the transparent substrates include a first substrate with a plurality of first terminals and a second substrate with a plurality of second terminals, the control circuit is connected to the first substrate and the second substrate through flexible printed circuits (FPC), and the first substrate is connected to the FPC through the plurality of first terminals, and the second substrate is connected to the FPC through the plurality of second terminals.

13. The display device according to claim 12, wherein the FPC include a root part connected to the second terminals and a distal part connected to the control circuit, and a width of the distal part is smaller than a width of the root part.

14. The display device according to claim 1, wherein a gap between the transparent substrates is equal to or smaller than 7 µm.

15. The display device according to claim 1, wherein an inner edge of the sealing part is positioned inside of the edges of the electrodes.

16. The display device according to claim 15, wherein the inner edge of the sealing part is entirely positioned inside of the edges of the electrodes.

17. The display device according to claim 16, wherein the outer edge of the sealing part is entirely positioned outside of the edges of the electrodes.

18. The display device according to claim 1, wherein a thickness of each of the transparent substrates is equal to or smaller than 0.55 mm and equal to or larger than 0.3 mm.

* * * * *